United States Patent
Lee

(10) Patent No.: US 8,984,964 B2
(45) Date of Patent: Mar. 24, 2015

(54) TORQUE MEASUREMENT DEVICE

(71) Applicant: LG Innotek Co., Ltd., Seoul (KR)

(72) Inventor: Chang Hwan Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/075,364

(22) Filed: Nov. 8, 2013

(65) Prior Publication Data

US 2014/0123770 A1 May 8, 2014

(30) Foreign Application Priority Data

Nov. 8, 2012 (KR) .................. 10-2012-0126306

(51) Int. Cl.
  *G01L 3/02* (2006.01)
  *G01L 3/10* (2006.01)
(52) U.S. Cl.
  CPC . *G01L 3/101* (2013.01); *G01L 3/10* (2013.01); *G01L 3/104* (2013.01)
  USPC .................................................. 73/862.193
(58) Field of Classification Search
  USPC .................................................. 73/862.193
  See application file for complete search history.

(56) References Cited

U.S. PATENT DOCUMENTS

2008/0250873 A1* 10/2008 Prudham et al. .......... 73/862.334
2012/0260746 A1* 10/2012 Lee ........................... 73/862.332
2013/0305843 A1* 11/2013 Lee et al. ................... 73/862.325

FOREIGN PATENT DOCUMENTS

DE   10-2005-018286 A1   10/2006
WO   WO-02/071019 A1    9/2002

OTHER PUBLICATIONS

European Search Report in European Application No. 13/191,696, filed Jan. 27, 2014.

* cited by examiner

*Primary Examiner* — Lisa Caputo
*Assistant Examiner* — Jamel Williams
(74) *Attorney, Agent, or Firm* — Saliwanchik, Lloyd & Eisenschenk

(57) ABSTRACT

Provided is a torque measurement device including a stator in which a space portion is formed by a first annular ring and a second annular ring having protrusion pieces, a ring-shaped magnet disposed in the space portion, and a collector assembly including a first collector member and a second collector member to form at least one insertion space in which a magnetic element is disposed, wherein the insertion space is formed by bending an end of the first collector member and an end of the second collector member toward the space portion.

9 Claims, 3 Drawing Sheets

TORQUE MEASUREMENT DEVICE

CROSS-REFERENCE TO RELATED APPLICATION

This application claims the benefit under 35 U.S.C. §119 of Korean Patent Application No. 10-2012-0126306, filed Nov. 8, 2012, which is hereby incorporated by reference in its entirety.

BACKGROUND

1. Field of the Invention

The present invention relates to a torque measurement device capable of measuring a torque of a steering system.

2. Discussion of Related Art

In general, in a vehicle, a steering wheel connected to wheels is manipulated to change a driving direction. However, when a resistance between the wheels and a road surface is high or steering is interfered, a manipulation force may be decreased to make it difficult to rapidly manipulate the steering wheel, and in order to solve the problem, a power steering apparatus is used. The power steering apparatus is an apparatus for reducing manipulation power via a power device configured to assist manipulation of the steering wheel.

In order to assist the manipulation of the steering wheel via the power device, the torque applied to a steering shaft should be measured. Accordingly, various types of apparatuses are used to measure the apparatus for measuring the torque of the steering wheel. In particular, the technique of measuring a magnetic field between the steering shaft and a magnet coupled to the steering shaft to detect a torque has good economic feasibility and is widely used.

A general steering system is constituted of an input shaft to which a steering wheel is coupled, an output shaft coupled to a pinion meshed with a rack bar on a wheel side, and a torsion bar and a torque measurement device configured to connect the input shaft and the output shaft.

When the steering wheel is rotated, the rotational force is transmitted to the output shaft and the direction of the wheel is changed by an action of the pinion and the rack bar. In this case, since the input shaft is more largely rotated more when the resistance is more strongly applied, the torsion bar is twisted and the twisted level of the torsion bar is measured by a magnetic field type torque measurement device.

In recent times, research on a structure for minimizing the size of the torque measurement device while maximally suppressing a flux leakage generated therefrom is actively being performed.

BRIEF SUMMARY

The present invention is directed to a torque measurement device capable of minimizing a size of the torque measurement device while maintaining performance of a conventional torque measurement device.

According to an aspect of the present invention, there is provided a torque measurement device including: a stator in which a space portion is formed by a first annular ring and a second annular ring having protrusion pieces; a ring-shaped magnet disposed in the space portion; and a collector assembly including a first collector member and a second collector member to form at least one insertion space in which a magnetic element is disposed, wherein the insertion space is formed by bending an end of the first collector member and an end of the second collector member toward the space portion.

In the torque measurement device, the first collector member may be disposed near an outer surface of the first annular ring and the second collector member may be disposed near an outer surface of the second annular ring.

In the torque measurement device, the first collector member may be disposed near an inner surface of the first annular ring and the second collector member may be disposed near an inner surface of the second annular ring.

In the torque measurement device, the first collector member and the second collector member may include flux transfer surfaces disposed near the first or second annular ring; opposite surfaces connected to the flux transfer surfaces and bent in facing directions; and insertion surfaces connected to the opposite surfaces and bent toward the space portion between the first annular ring and second annular ring to dispose the magnetic element therein.

In the torque measurement device, protrusions may be formed at ends of the insertion surfaces of the first collector member and the second collector member in facing directions.

In the torque measurement device, ends of the insertion surfaces may protrude inward from an imaginary line connecting an end of the first annular ring and an end of the second annular ring.

In the torque measurement device, ends of the insertion surfaces may coincide with an imaginary line connecting an end of the first annular ring and an end of the second annular ring.

In the torque measurement device, the protrusion pieces of the first annular ring and the second annular ring may be alternately formed.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION

Figure 1:
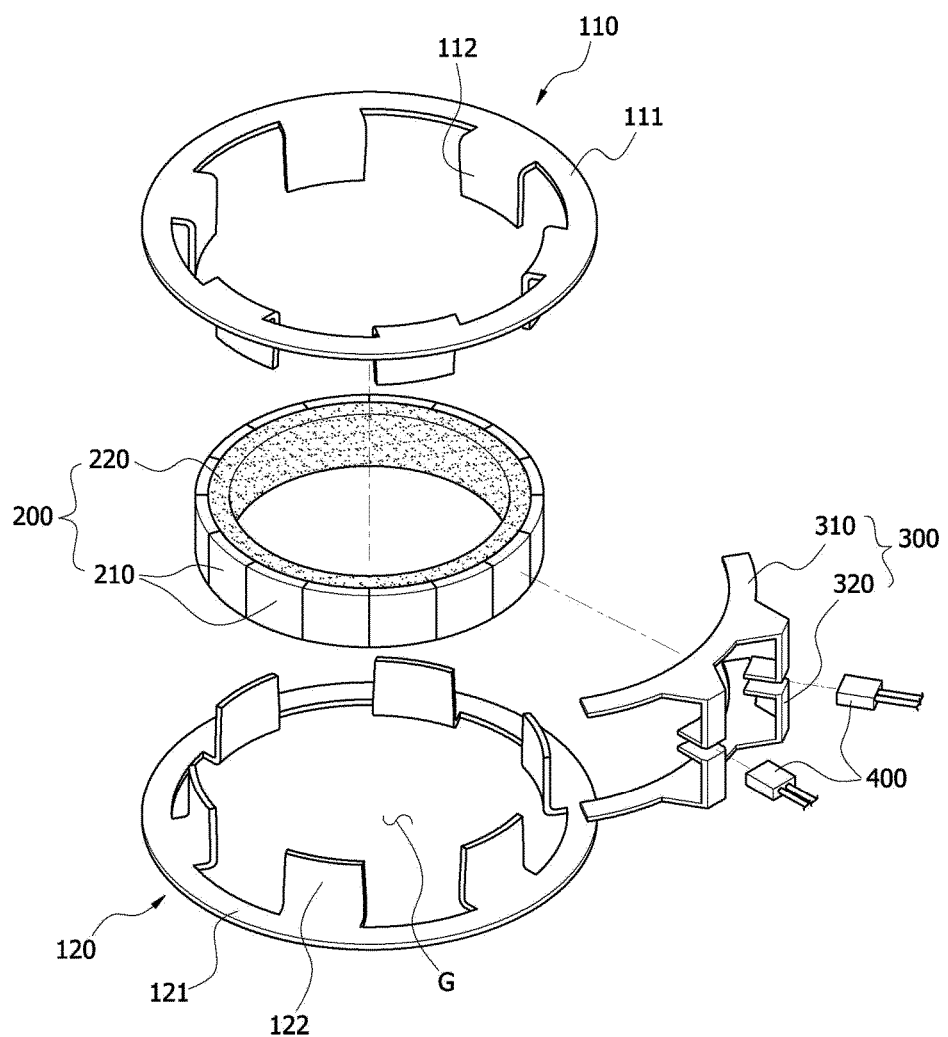
FIG. 1 is an exploded perspective view of a torque measurement device according to an embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

In the present invention, it will be understood that terms "include," "have," or the like, means presence of features, numbers, steps, operations, components, parts, or a combination thereof, described herein, but does not previously exclude probability of presence or addition of one or more other features, numbers, steps, operations, components, parts, or a combination thereof.

In addition, the accompanying drawings of the present invention may be exaggerated or reduced in size for the convenience of description.

Hereinafter, the present invention will be described with reference to the accompanying drawings, and the same or corresponding components are designated by the same reference numerals and overlapping description will not be repeated.

Figure 2:
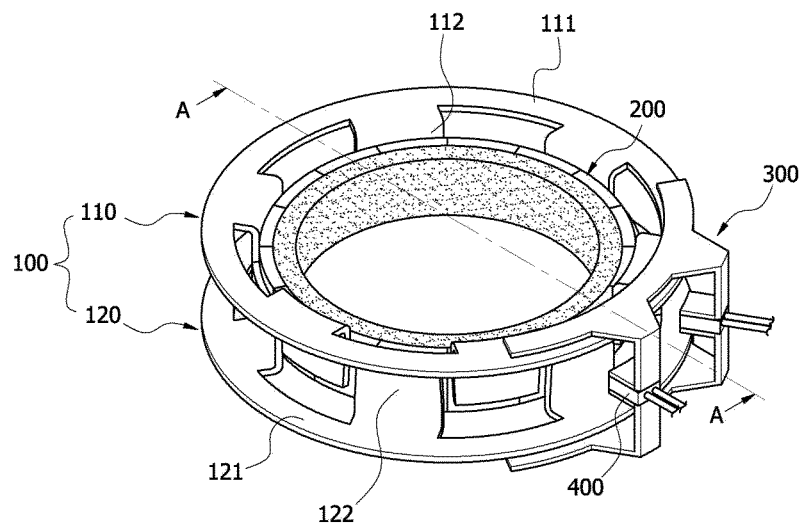
FIG. 2 is a perspective view of the torque measurement device according to the embodiment of the present invention.

FIG. 1 is an exploded perspective view of a torque measurement device according to an embodiment of the present invention, and FIG. 2 is a perspective view of the torque measurement device according to the embodiment of the present invention.

Referring to FIGS. 1 and 2, the torque measurement device according to the present invention includes a stator 100 including a first annular ring 111 and a second annular ring 121 opposite to and spaced apart from each other and having protrusion pieces 112 and 122 formed in directions in which the first annular ring 111 and the second annular ring 121 are opposite to each other to form a space portion G therein, a rotor 200 including a ring-shaped magnet 210 disposed in the space portion G, and a collector assembly 300 including a first collector member 310 disposed near the first annular ring 111 and a second collector member 320 disposed near the second annular ring 121.

The stator 100 includes a first stator member 110 and a second stator member 120 spaced apart from each other. Specifically, the first annular ring 111 and the second annular ring 121 are spaced apart from each other in an axial direction thereof, and a plurality of protrusion pieces 112 and 122 are formed at an inner surface of the annular ring. The protrusion pieces 112 and 122 of the first annular ring 111 and the second annular ring 121 are alternately formed in facing directions to form the space portion G. Specifically, the protrusion pieces 112 and 122 may be formed to be narrowed as it goes from a side near the ring toward an end side.

The rotor 200 is disposed in the space portion G defined by the protrusion pieces 112 and 122 of the stator and configured to be fitted onto an input shaft or an output shaft to be rotated therewith. The rotor 200 has an annular magnet holder 220 to which the ring-shaped magnet 210 is attached.

When torsion occurs from a torsion bar due to a difference in rotational amounts of the input shaft (or the output shaft) coupled to the ring-shaped magnet 210 and the output shaft (or the input shaft) coupled to the stator 100, the ring-shaped magnet 210 and the stator 100 are relatively rotated, and opposite surfaces between an outer circumferential surface of the magnet 210 and the protrusion pieces 112 and 122 are changed to vary a magnetization value.

The collector assembly 300 includes the first collector member 310 disposed near the first annular ring 111 of the first stator member 110 to collect flux and the second collector member 320 disposed near the second annular ring 121 to collect flux.

A magnetic element 400 inserted between the first collector member 310 and the second collector member 320 detects a magnetization amount of the stator 100 magnetized by concentrating the collected flux. The magnetic element may be a Hall element (Hall IC) configured to detect intensity of a magnetic field.

Figure 3:
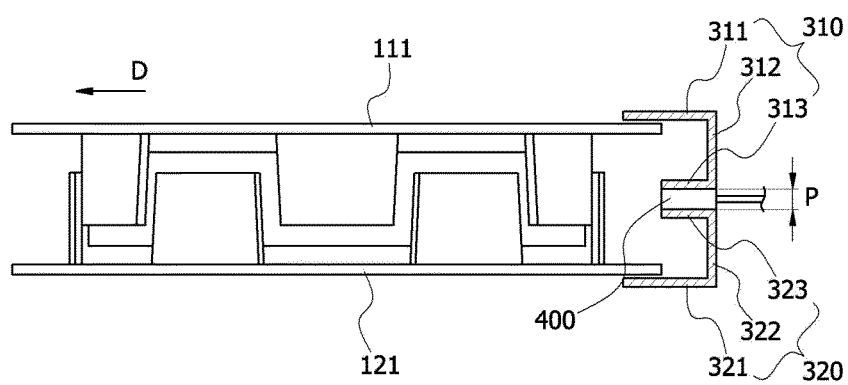
FIG. 3 is a side view of the torque measurement device according to the embodiment of the present invention.
Figure 4:
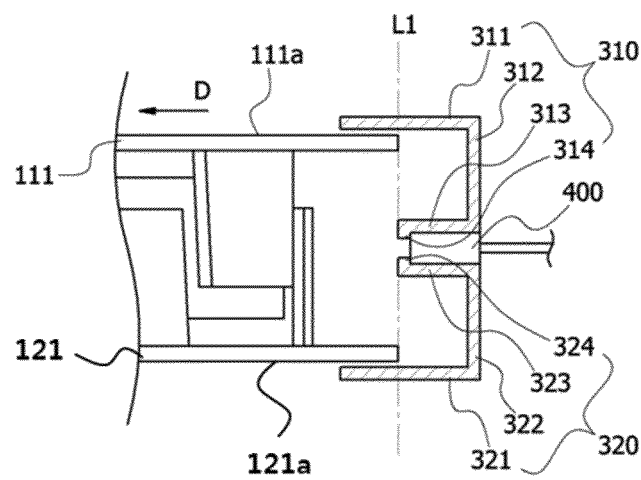
FIG. 4 is an enlarged view of a portion of FIG. 3.

FIG. 3 is a side view of the torque measurement device according to the embodiment of the present invention, and FIG. 4 is an enlarged view of a portion of FIG. 3.

Referring a feature of the present invention with reference to FIGS. 3 and 4, the collector assembly 300 has at least one insertion space P into which the magnetic element 400 is inserted between the first collector member 310 and the second collector member 320. Accordingly, since the flux collected by the first collector member 310 and the second collector member 320 is concentrated to the insertion space P, the magnetic element 400 can precisely detect the intensity of the magnetic field.

The insertion space P may be formed by bending an end of the first collector member 310 and an end of the second collector member 320 toward the space portion G between the first annular ring 111 and the second annular ring 121 (in a D direction of FIG. 3).

Specifically, the first collector member 310 and the second collector member 320 include flux transfer surfaces 311 and 321 disposed near the first or second annular ring 111 or 121, opposite surfaces 312 and 322 connected to the flux transfer surfaces 311 and 321 and bent in the facing directions, and insertion surfaces 313 and 323 connected to the opposite surfaces and bent toward the space portion between the first annular ring 111 and the second annular ring 121 in the D direction.

The flux transfer surfaces 311 and 321 are formed to correspond to a circumferential surface of the first or second annular ring 111 or 121 to effectively collect the flux. The opposite surfaces 312 and 322 concentrate the collected flux to the insertion surfaces 313 and 323.

Specifically, since the opposite surfaces 312 and 322 are formed in the facing directions, the opposite surface 312 of the first collector member 310 may be bent toward the second annular ring 121, and the opposite surface 322 of the second collector member 320 may be bent toward the first annular ring 111. However, the opposite surfaces 312 and 322 may not be bent perpendicular to the flux transfer surfaces 311 and 321.

The insertion surface 313 of the first collector member 310 and the insertion surface 323 of the second collector member 320 are bent toward the space portion between the first annular ring 111 and the second annular ring 121 (in the D direction). Accordingly, the insertion space P between the insertion surfaces 313 and 323 may have a gap through which the magnetic element 400 can be inserted. Here, since the insertion surfaces 313 and 323 are bent toward the space portion in the D direction rather than an outward direction, an external size of the torque measurement device can be minimized.

Referring to FIG. 4, when the first collector member 310 is disposed near an outer surface 111a of the first annular ring 111 and the second collector member 320 is disposed near an outer surface 121a of the second annular ring 121, a leakage of the flux generated between the first collector member 310 and the second collector member 320 can be maximally inhibited and a size of a product can be minimized.

In addition, protrusions 314 and 324 are formed at ends of the insertion surfaces 313 and 323 in the facing directions to function as a stopper configured to control an insertion depth of the magnetic element 400. In this case, assembly may be easily performed. Here, the protrusions 314 and 324 may extend to come in contact with each other to isolate the magnetic element 400 from the space portion, and a flux shielding film may be formed at outer surfaces of the protrusions 314 and 324 (surfaces facing the space portion) to inhibit the leakage of the flux.

Ends of the insertion surfaces 313 and 323 may be configured to coincide with an imaginary line L1 connecting an end of the first annular ring 111 and an end of the second annular ring 121. However, the present invention is not limited thereto but the ends of the insertion surfaces 313 and 323 may protrude inward from the imaginary line L1. When the ends of the insertion surfaces 313 and 323 protrude inward from the imaginary line L1, the leakage of the flux generated between the first annular ring 111 and the second annular ring 121 can be maximally suppressed.

Figure 5:
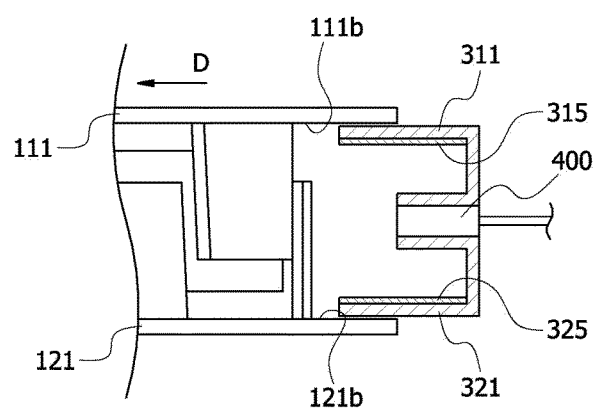
FIG. 5 is a variant of FIG. 4.

Referring to FIG. 5, the first collector member 310 may be disposed near an inner surface 111b of the first annular ring 111 and the second collector member 320 may be disposed near an inner surface 121b of the second annular ring 121. According to this structure, a height of the collector assembly 300 can be reduced to minimize the size of the product.

In addition, the first annular ring 111 and the second annular ring 121 can inhibit the leakage of the flux generated therebetween. However, since the flux may leak between the first collector member 310 and the second collector member 320, shielding members may be formed at surfaces facing the first collector member 310 and the second collector member 320.

As can be seen from the foregoing, the size of the torque measurement device can be minimized while maintaining performance of the conventional torque measurement device.

In addition, the leakage of the flux in the torque measurement device can be inhibited to precisely detect the torque. Accordingly, when the torque measurement device is used, precision of the steering system can be increased to improve stability of a vehicle.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A torque measurement device comprising:
   a stator including a space portion formed by a first annular ring and a second annular ring having protrusion pieces;
   a ring-shaped magnet disposed in the space portion; and
   a collector assembly including a first collector member and a second collector member to form at least one insertion space in which a magnetic element is configured to be disposed,
   wherein the insertion space is defined by an end of the first collector member and an end of the second collector member extended toward the space portion, and
   wherein the first collector member and the second collector member comprise:
   flux transfer surfaces disposed near the first or second annular ring;
   opposite surfaces connected to the flux transfer surfaces and bent in facing directions; and
   insertion surfaces connected to the opposite surfaces and bent toward the space portion between the first annular second annular ring and second annular ring configured to dispose the magnetic element therein.

2. The torque measurement device according to claim 1, wherein the first collector member is disposed near an outer surface of the first annular ring and the second collector member is disposed near an outer surface of the second annular ring.

3. The torque measurement device according to claim 1, wherein the first collector member is disposed near an inner surface of the first annular ring and the second collector member is disposed near an inner surface of the second annular ring.

4. The torque measurement device according to claim 1, wherein protrusions are formed at ends of the insertion surfaces of the first collector member and the second collector member in facing directions.

5. The torque measurement device according to claim 1, wherein ends of the insertion surfaces protrude inward from an imaginary line connecting an end of the first annular ring and an end of the second annular ring.

6. The torque measurement device according to claim 1, wherein ends of the insertion surfaces coincide with an imaginary line connecting an end of the first annular ring and an end of the second annular ring.

7. The torque measurement device according to claim 1, wherein the protrusion pieces of the first annular ring and the second annular ring are alternately formed.

8. A steering apparatus comprising the torque measurement device according to claim 1.

9. A vehicle comprising the torque measurement device according to claim 1.

* * * * *